United States Patent
Jung

(10) Patent No.: US 9,526,934 B2
(45) Date of Patent: Dec. 27, 2016

(54) SIDE BRACKET FOR FIXING SPRINKLER JOINT

(71) Applicant: SEUNG JIN IND. CO., LTD, Gyeonggi-do (KR)

(72) Inventor: Hye Ri Jung, Gyeonggi-do (KR)

(73) Assignee: SEUNG JIN IND. CO., LTD., Ansan-si, Gyeonggi-do (KR)

( * ) Notice: Subject to any disclaimer, the term of this patent is extended or adjusted under 35 U.S.C. 154(b) by 0 days.

(21) Appl. No.: 14/574,961

(22) Filed: Dec. 18, 2014

(65) Prior Publication Data

US 2016/0023028 A1    Jan. 28, 2016

(30) Foreign Application Priority Data

Jul. 25, 2014   (KR) .................. 10-2014-0094725

(51) Int. Cl.
| | |
|---|---|
| A62C 35/00 | (2006.01) |
| A62C 35/68 | (2006.01) |
| F16M 13/02 | (2006.01) |
| F16B 2/14 | (2006.01) |
| F16B 2/10 | (2006.01) |

(52) U.S. Cl.
CPC .............. *A62C 35/68* (2013.01); *F16B 2/10* (2013.01); *F16B 2/14* (2013.01); *F16M 13/027* (2013.01)

(58) Field of Classification Search
USPC ..... 248/342, 343, 75, 220.21, 220.6; 169/37
See application file for complete search history.

(56) References Cited

U.S. PATENT DOCUMENTS

| | | | | |
|---|---|---|---|---|
| 7,506,845 | B2* | 3/2009 | Oh ........................... | F16L 3/24 248/72 |
| 8,109,482 | B2* | 2/2012 | Oh ........................ | A62C 35/68 248/342 |
| 8,413,734 | B2* | 4/2013 | Silcox .................... | A62C 35/68 169/16 |
| 8,500,079 | B2* | 8/2013 | Oh ........................ | A62C 35/68 239/283 |
| 9,004,422 | B2* | 4/2015 | Feenstra ................ | A62C 35/68 248/200.1 |
| 2005/0139743 | A1* | 6/2005 | Shim ...................... | E04B 9/006 248/342 |
| 2007/0063121 | A1* | 3/2007 | Oh ........................ | A62C 35/68 248/342 |

* cited by examiner

*Primary Examiner* — Steven Marsh
(74) *Attorney, Agent, or Firm* — Rabin & Berdo, P.C.

(57) ABSTRACT

Disclosed is a side bracket for fixing a sprinkler joint. The side bracket for fixing the sprinkler joint includes a distance controller installed at a lower portion of one of side wall supporting portions of the side bracket, wherein the distance controller includes an inclined plate installed at an outer surface of the side wall supporting portion, a rotational member installed along a center line of the inclined plate, and a fixing shaft configured to connect the inclined plate with the rotational member and to pass through and be fixed to the pair of side wall supporting portions.

5 Claims, 6 Drawing Sheets

SIDE BRACKET FOR FIXING SPRINKLER JOINT

CROSS-REFERENCE TO RELATED APPLICATION

This application claims priority to and the benefit of Korean Patent Application No. 2014-0094725, filed on Jul. 25, 2014, the disclosure of which is incorporated herein by reference in its entirety.

BACKGROUND

1. Field of the Invention

The present invention relates to a side bracket for fixing a sprinkler joint, and more particularly, to a side bracket for fixing a sprinkler joint, in which a fixing structure is formed by coupling a channel and a square bar in a grid manner, and when the side bracket is fixed to a wing portion of the channel, it may be simply and easily fixed and coupled.

2. Discussion of Related Art

Generally, a sprinkler is an automatic fire extinguishing system in which a fuse automatically blows when a fire breaks out, and water spouts from a sprinkler head installed at a ceiling texture of a room, thereby performing a fire-extinguishing operation and simultaneously informing of outbreak of the fire.

FIG. 1 is a view illustrating a general sprinkler.

As illustrated in FIG. 1, in the sprinkler S, a flexible pipe 300 is branched from a main pipe 100' through which fire-fighting water is supplied, a reducer 400 is coupled to a lower end of the flexible pipe 300, a head 700 is coupled to a lower end of the reducer 400, and the head 700 is inserted into and fixed to a through-hole punched at a ceiling texture 60. The flexible pipe 300, the reducer 400 and the head 700 are collectively called a sprinkler joint.

FIG. 2 is a perspective view illustrating a structure in which a lower portion of a conventional sprinkler joint is fixed.

As illustrated in FIGS. 1 and 2, a fixing structure AO of the conventional sprinkler joint includes two channels 600' installed to be spaced a predetermined distance and thus to fix the ceiling texture 60 and have a cross-sectional "U" shape, a square bar 500' disposed across between the channels 600', and a side bracket 1' configured to couple the channels 600' with the square bar 500'.

Further, the fixing structure AO further includes a central fixing bracket 2' installed at a center of the square bar 500', having a through-hole in which the reducer 400 is inserted, and also having a second bolt 22' provided at one side thereof to be pressed and coupled to a side surface of the square bar 500'.

The channel 600' is formed in a "⊔" shape by bending both ends of a metal plate and forming wing portions 610' and 620' at both sides thereof, and installed to be stood on its side so that the both wing portions 610' and 620' are located up and down, and the two channels 600' may be arranged to face each other.

Further, the side bracket 1' is fixed to the channel 600' by inserting the upper wing portion 610' of the channel 600' into a slit formed at a front surface thereof and supporting the upper wing portion 610' using a fastening bolt 11' fastened on the upper portion of the side bracket 1'.

However, in the related art, since the channel 600' is installed to be stood on its side, a surface area in contact with the ceiling texture 60 is small, and thus there is a problem in that it may not provide sufficient supporting force.

To solve the problem, the channel 600' should be disposed so that a wide surface thereof is in contact with the ceiling texture 60. However, 'when the channel 600' is disposed to have a wider width, the channel 600' may not be installed using the above-mentioned conventional side bracket 1'.

Meanwhile, FIG. 3 is a perspective view illustrating another structure in which the lower portion of the conventional sprinkler joint is fixed.

In another related art, as illustrated in FIG. 3, one wing portion 610' of the channel 600' is cut and then bent upwardly vertically again so as to form a piece portion 630' which may be pinched and supported.

Further, lower portions of the side bracket 1' are bent inwardly, and forms stepped portions 12' as pinchable and supportable portions, and a bolt 13' which passes through and couples both side plates of the side bracket 1' is fastened.

Therefore, the stepped portions 12' of the side bracket 1' pinches and supports the piece portion 630' of the channel 600', and then the bolt 13' is fastened to fix them.

However, when the conventional sprinkler joint is used for a long period of time, the bolt 13' is loosened by shaking of the flexible pipe 300 due to a water hammer action, and thus pinching force is sharply reduced, and thus the channel 600' may be separated from the side bracket 1'.

SUMMARY OF THE INVENTION

The present invention is directed to a side bracket for fixing a sprinkler joint, in which, in a fixing structure formed by coupling a channel and a square bar in a grid manner, when the side bracket is fixed to a wing portion of the channel, it may be simply and easily fixed and coupled.

According to an aspect of the present invention, there is provided a side bracket for fixing the sprinkler joint, which couples two channels installed to be spaced a predetermined distance and to fix a ceiling texture and having horizontal wing portions at both ends thereof, and a square bar disposed across between the channels, the side bracket for fixing a sprinkler joint including one pair of side wall supporting portions, an upper connection portion configured to connect upper ends of the side wall supporting portions, channel coupling portions provided at lower ends of the side wall supporting portions to be coupled to the channels, and a distance controller installed at a lower portion of one of the side wall supporting portions of the side bracket, wherein the distance controller includes an inclined plate installed at an outer surface of the side wall supporting portion, a rotational member installed along a center line of the inclined plate, and a fixing shaft configured to connect the inclined plate with the rotational member and to pass through and be fixed to the pair of side wall supporting portions.

The inclined plate may be formed to be divided into both sides arranged to be opposite to each other with respect to the center line, and a first inclined surface and a first flat portion continuously formed at an upper end of the first inclined surface may be provided at one side of the inclined plate, and a second inclined surface and a second flat portion continuously formed at an upper end of the second inclined surface may be provided at the other side of the inclined plate.

The first and second flat portions may have a groove structure to prevent separation of the pressing portions.

The rotational member may include a grip portion gripped and rotated by an operator, and one pair of pressing portions formed to protrude under the grip portion and to press the inclined plate while being rotated and in contact with the inclined plate.

One side of the fixing shaft may be coupled to a center of the rotational member so that the rotational member is capable of being rotated, and the other side thereof may be fixed to the side wall supporting portion in which the distance controller is not installed.

According to another aspect of the present invention, there is provided a side bracket for fixing the sprinkler joint, which couples two channels installed to be spaced a predetermined distance and to fix a ceiling texture and having horizontal wing portions at both ends thereof, and a square bar disposed across between the channels, the side bracket for fixing a sprinkler joint including one pair of side wall supporting portions, an upper connection portion configured to connect upper ends of the side wall supporting portions, channel coupling portions provided at lower ends of the side wall supporting portions to be coupled to the channels, and a distance controlling portion installed at one side of the side wall supporting portions of the side bracket, wherein the distance controlling portion is formed so that the one side of the side wall supporting portions protrudes concavely inwardly and thus has a concave shape which is stepped inwardly from a flat surface, and further includes a tightening member coupled with the distance controlling portion to narrow a gap between the channel coupling portions.

A locking piece may be integrally formed at both upper and lower portions of one end of the distance controlling portion.

The tightening member may include a hooking portion caught by the locking piece to prevent further movement, a flat portion corresponding to a flat surface of the distance controlling portion, and a tightening portion configured to narrow the gap between the pair of side wall supporting portions.

A height of the hooking portion may be greater than that of the tightening portion.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

[Detailed Description of Main Elements]

| | |
|---|---|
| 150: side bracket | 160: side wall supporting portion |
| 170: channel coupling portion | 180: upper connection portion |
| 190: bolt | 200: distance controller |
| 210: inclined plate | 211: first inclined surface |
| 213: first flat portion | 215: second inclined surface |
| 217: second flat portion | 220: rotational member |
| 221: grip portion | 223: pressing portion |
| 230: fixing shaft | 310: distance controlling portion |
| 330: tightening member | |

DETAILED DESCRIPTION OF EXEMPLARY EMBODIMENTS

A side bracket for fixing a sprinkler joint according to various embodiments of the present invention will be described in detail below with reference to the accompanying drawings.

Figure 1:
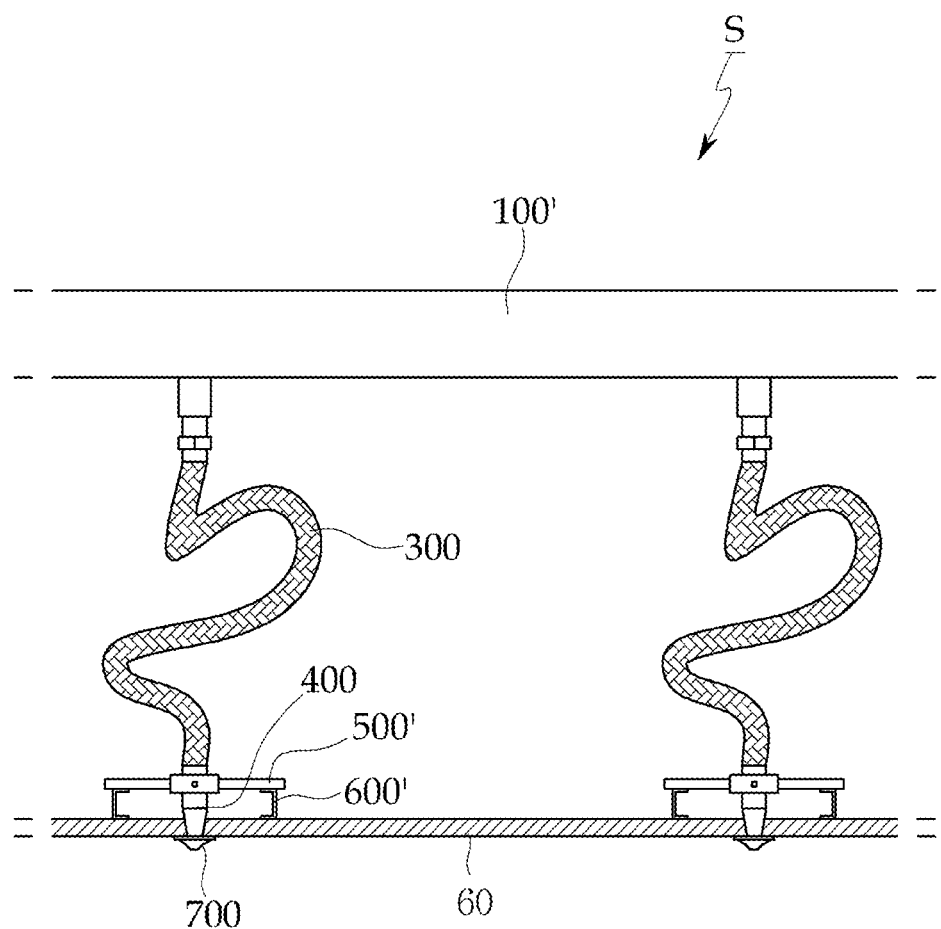
FIG. 1 is a view illustrating a general sprinkler
Figure 2:
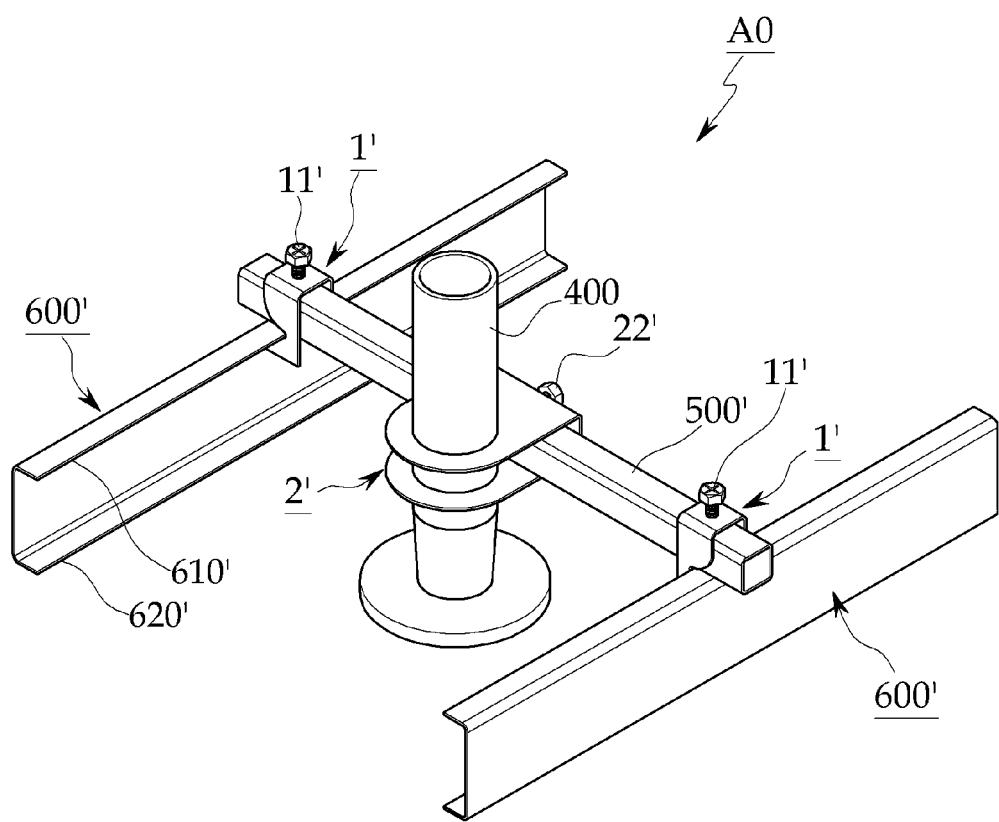
FIG. 2 is a perspective view illustrating a structure in which a lower portion of a conventional sprinkler joint is fixed.
Figure 3:
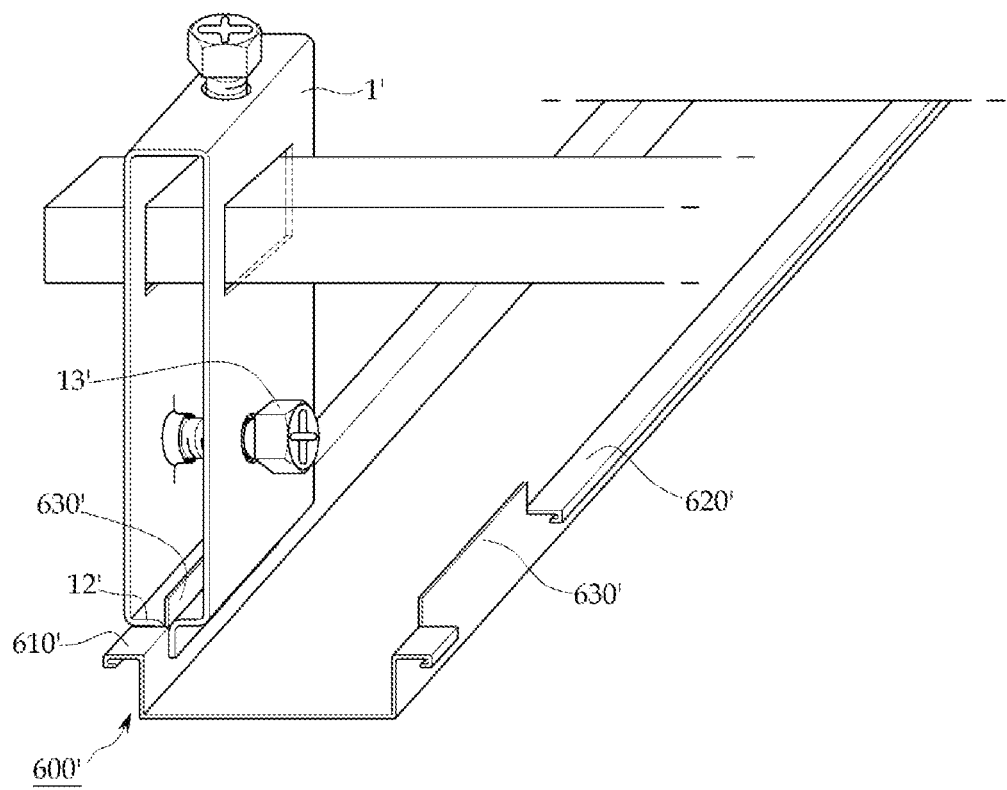
FIG. 3 is a perspective view illustrating another structure in which the lower portion of the conventional sprinkler joint is fixed.
Figure 4:
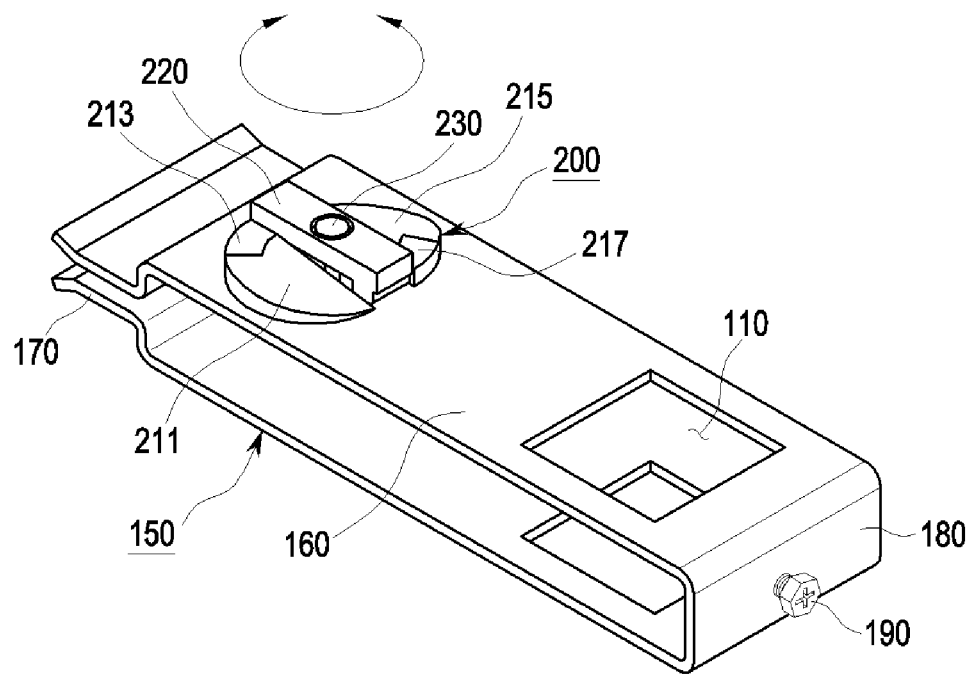
FIG. 4 is a perspective view of a side bracket for fixing a sprinkler joint according to the present invention.
Figure 5:
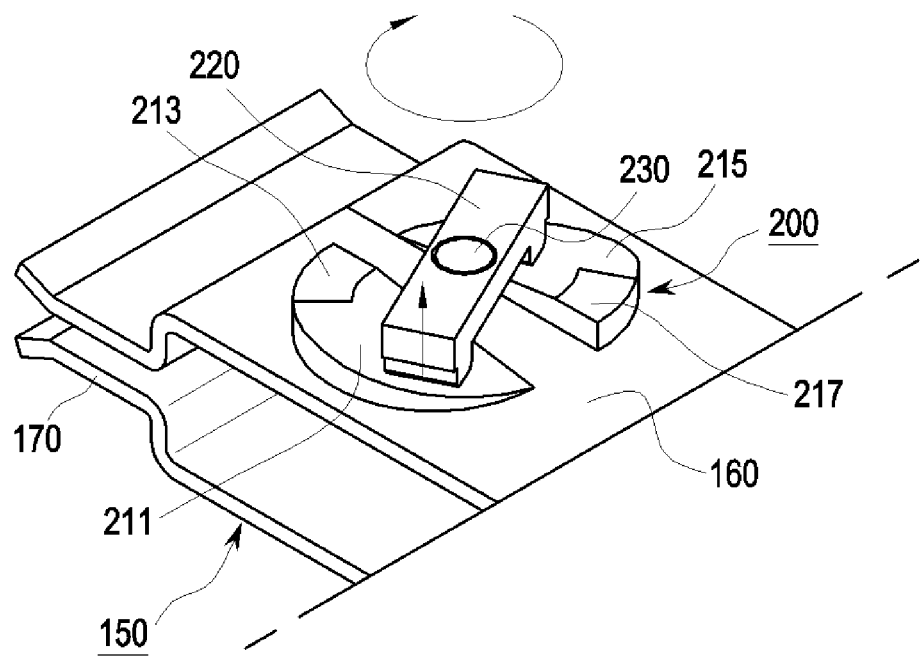
FIG. 5 is a perspective view illustrating an operation state of the side bracket for fixing the sprinkler joint according to the present invention.
Figure 6:
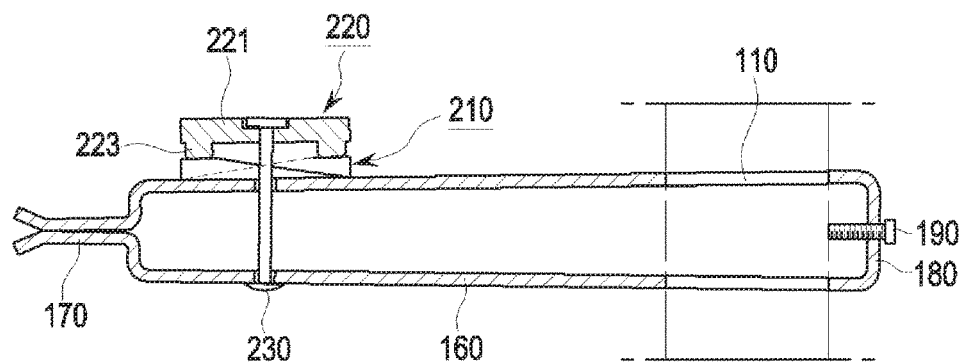
FIG. 6 is a cross-sectional view of the side bracket for fixing the sprinkler joint according to the present invention.

FIG. 4 is a perspective view of a side bracket for fixing a sprinkler joint according to a first embodiment the present invention, FIG. 5 is an enlarged perspective view of a distance controller of FIG. 4, and FIG. 6 is a cross-sectional view of FIG. 4.

As illustrating in FIGS. 4 to 6, the side bracket 150 for fixing the sprinkler joint according to the present invention serves to couple two channels 600 installed to be spaced a predetermined distance and to fix a ceiling texture and having horizontal wing portions at both ends thereof, and a square bar 500 disposed across between the channels 600.

A reducer may be fixed to a center of the square bar 500 by a separate central fixing bracket, and a sprinkler head is fixed to the reducer.

The side bracket 150 includes one pair of side wall supporting portions 160, an upper connection portion 180 configured to connect upper ends of the side wall supporting portions 160, and a channel coupling portion 170 provided at a lower end of each side wall supporting portion 160 to be coupled to the channel 600.

A distance controller 200 is installed at a lower portion of the side wall supporting portion 160 of the side bracket 150, and an opening 100 through which the square bar 500 is inserted and installed is formed at an upper side thereof.

The distance controller 200 serves to increase and reduce a distance between the pair of side wall supporting portions 160, and thus the channel coupling portions 170 may be tightened or released.

Therefore, when the channel coupling portions 170 are tightened in a state in which the channel 600 is interposed therebetween, the pair of channel coupling portions 170 may be firmly fixed to the channel 600.

The distance controller 200 includes an inclined plate 210 installed at an outer surface of the side wall supporting portion 160, a rotational member 220 installed along a center line of the inclined plate 210, and a fixing shaft 230 configured to connect the inclined plate 210 with the rotational member 220 and to pass through and be fixed to the pair of side wall supporting portions 160.

The inclined plate 210 is formed to be divided into both sides, and the both sides are arranged to be opposite to each other with respect to the center line. A first inclined surface 211 and a first flat portion 213 continuously formed at an upper end of the first inclined surface 211 are provided at one side of the inclined plate 210, and a second inclined surface 215 and a second flat portion 217 continuously formed at an upper end of the second inclined surface 215 are provided at the other side of the inclined plate 210.

Further, the rotational member 220 rotatably installed along the center line of the inclined plate 210 includes a grip portion 221 gripped and rotated by an operator, and one pair of pressing portions 223 formed to protrude under the grip portion 221 and to press the inclined plate 210 while being rotated and in contact with the inclined plate 210.

The pair of pressing portions 223 is rotated while being respectively in contact with the first inclined surface 211 and the second inclined surface 215, and stopped when arriving at the first and second flat portions 213 and 217.

At this time, the first and second flat portions 213 and 217 may have a groove structure having a shallow depth to prevent separation of the pressing portions 223.

One side of the fixing shaft 230 is coupled to a center of the grip portion 221 of the rotational member 220 so that the rotational member 220 may be rotated, and the other side thereof is fixed to the side wall supporting portion 160 in which the distance controller 200 is not installed.

A bolt 190 is installed at the upper connection portion 180 of the side bracket 150. As described in the related art, the bolt 190 serves to fix the square bar 500 inserted into the opening 110.

Hereinafter, an operation of the side bracket for fixing the sprinkler joint according to one embodiment of the present invention will be described.

To couple the square bar 500 to the two channels 600 spaced the predetermine distance to fix the ceiling texture, the side bracket 150 is installed at each of the two channels 600.

That is, the channel coupling portion 170 of the side bracket 150 is located at the wing portion of the channel 600, and then the rotational member 220 of the distance controller 200 is rotated.

Then, the rotational member 220 is rotated, and the pair of pressing portions 223 is in contact with the first and second inclined surfaces 211 and 215 of the inclined plate 210, and moved to an upper side of the inclined surface. The pressing portions 223 presses the inclined plate 210 while being moved along the inclined surface, and thus the side wall supporting portion 160 in which the inclined plate 210 is installed is pressed toward the opposite side wall supporting portion 160 with respect to the fixing shaft 230.

Ultimately, the channel coupling portions 170 integrally formed with the side wall supporting portions 160 are tightened to hold the wing portion of the channel 600 interposed therebetween, and thus the side bracket 150 may be firmly coupled to the channel 600.

At this time, the pressing portions 223 are moved upwardly along the first and second inclined surfaces 211 and 215, and placed on the first and second flat portions 213 and 217. The pressing portions 223 may be placed on the first and second flat portions 213 and 217 while being not moved any more.

Hereinafter, a side bracket for fixing a sprinkler joint according to a second embodiment of the present invention will be described with reference to FIG. 7.

In the description of the side bracket for fixing the sprinkler joint according to the second embodiment of the present invention, the same reference numerals are given to the same parts as those in the side bracket for fixing the sprinkler joint according to the first embodiment of the present invention, and the description or operation thereof will not be repeated.

Figure 7:
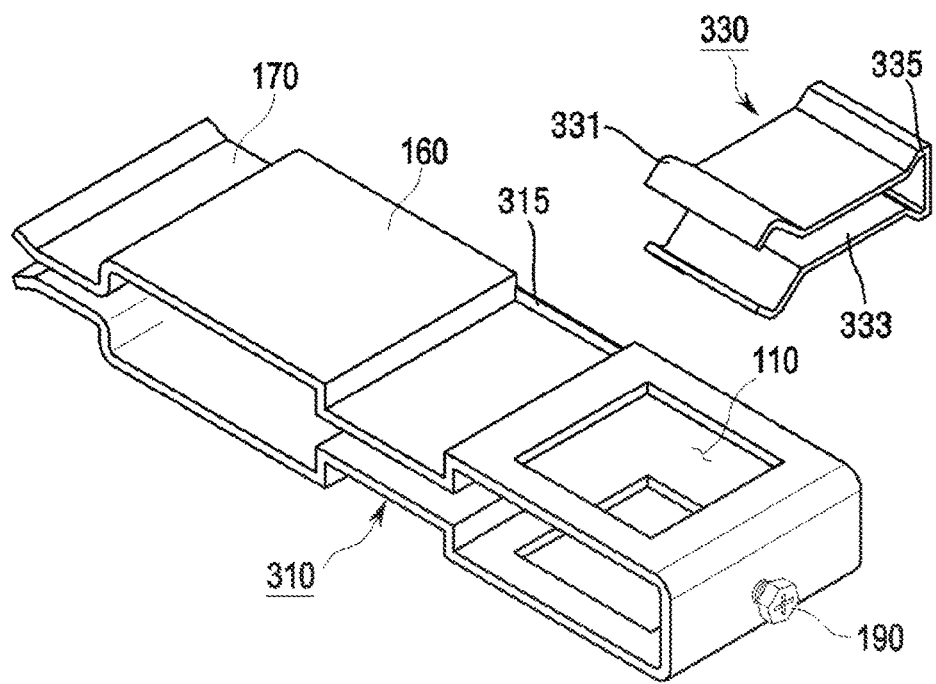
FIG. 7 is a perspective view illustrating the operation state of the side bracket for fixing the sprinkler joint according to the present invention.
Figure 8:
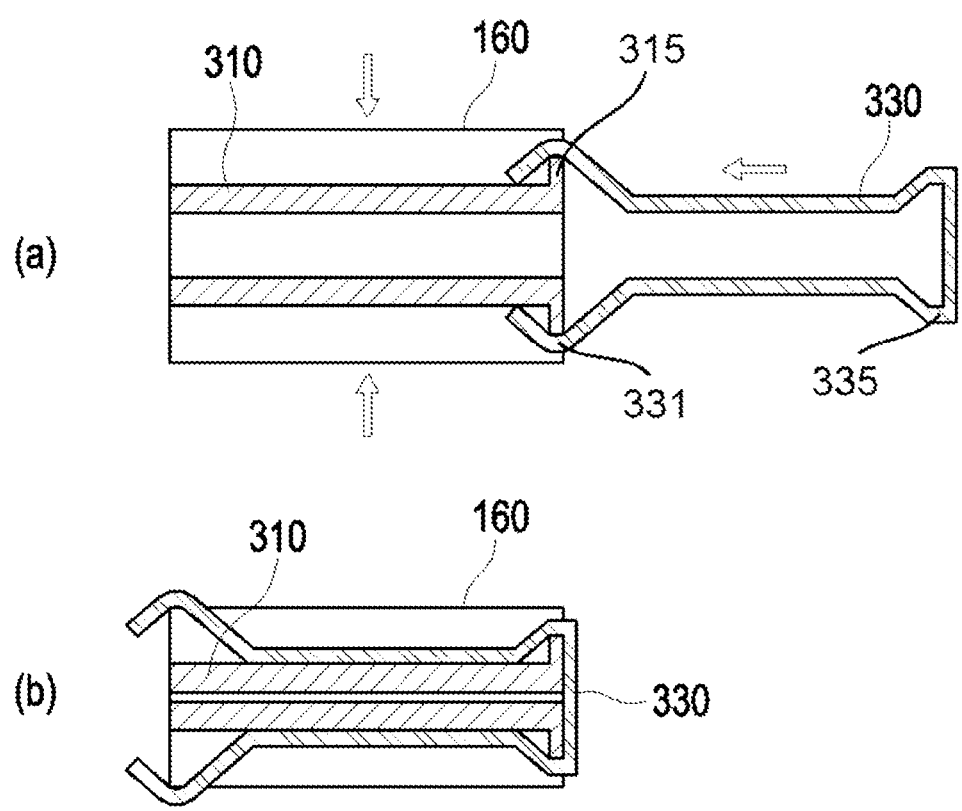
FIG. 8 is a cross-sectional view of FIG. 7.

FIG. 7 is a perspective view illustrating the operation state of the side bracket for fixing the sprinkler joint according to the second embodiment of the present invention, and FIG. 8 is a cross-sectional view of FIG. 7.

As illustrated in FIGS. 7 and 8, in the side bracket for fixing the sprinkler joint according to the second embodiment of the present invention, a distance controlling portion 310 is formed at one side of the pair of side wall supporting portions 160, and a tightening member 330 is installed at or removed from the distance controlling portion 310, and thus the distance between the channel coupling portions 170 may be adjusted.

The distance controlling portion 310 is formed so that the one side of the side wall supporting portions 160 protrudes concavely inwardly. That is, the distance controlling portion 310 has a concave shape which is stepped inwardly from a flat surface.

A locking piece 315 is integrally formed at both upper and lower portions of one end of the distance controlling portion 310. Therefore, the distance controlling portion 310 formed at each of the pair of side wall supporting portions 160 have no choice but to have a smaller gap than that between the side wall supporting portions 160.

The separate tightening member 330 is coupled to the locking piece 315 of the distance controlling portion 310. The tightening member 330 may be formed of a plate spring material.

The tightening member 330 includes a hooking portion 331 caught by the locking piece 315 to prevent further movement, a flat portion 333 corresponding to a flat surface of the distance controlling portion 310, and a tightening portion 335 configured to narrow the gap between the pair of side wall supporting portions 160.

At this time, a height of the hooking portion 331 should be greater than that of the tightening portion 335. Only in such a case, when the locking piece 315 is located at the hooking portion 331, the pair of side wall supporting portions 160 may be spread wider, and the channel coupling portions 170 may be spaced apart from each other. And when the locking piece 315 is located at the tightening portion 335, the gap between the pair of side wall supporting portions 160 becomes narrow and the channel coupling portions 170 are also tightened.

As described above, the side bracket may be coupled to the channel by tightening the gap between the channel coupling portions 170.

The hooking portion 331 has a tongs shape to catch the locking piece 315, and a middle portion thereof is formed to protrude in a mountain shape. Therefore, when the locking piece 315 is located at the hooking portion 331, the tightening member 330 may not be separated outwardly any more, and may stop at that position.

In FIG. 8A, the hooking portion 331 is located at the locking piece 315. In this case, the channel coupling portions 170 are spaced apart from each other. In this situation, if a user pushes the tightening member 330, and the tightening portion 335 is located at the locking piece 315, as illustrated in FIG. 8B, the channel coupling portions 170 are in close contact with each other.

According to the present invention, in the fixing structure formed by coupling the channel and the square bar in the grid manner, when the side bracket is fixed to a wing portion of the channel, it may be simply and easily fixed and coupled.

Further, according to the present invention, in the state in which the side bracket is coupled to the wing portion of the channel, the coupling is not easily released.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A side bracket for fixing a sprinkler joint, which couples two channels installed to be spaced a predetermined distance and to fix a ceiling texture and having horizontal wing portions at both ends thereof, and a square bar disposed across between the channels, the side bracket for fixing a sprinkler joint comprising:
   one pair of side wall supporting portions;
   an upper connection portion configured to connect upper ends of the side wall supporting portions;
   channel coupling portions provided at lower ends of the side wall supporting portions to be coupled to the channels; and
   a distance controller installed at a lower portion of one of the side wall supporting portions of the side bracket,
   wherein the distance controller comprises:
   an inclined plate installed at an outer surface of the side wall supporting portion;
   a rotational member installed along a center line of the inclined plate; and
   a fixing shaft configured to connect the inclined plate with the rotational member and to pass through and be fixed to the pair of side wall supporting portions.

2. The side bracket of claim 1, wherein the inclined plate includes
   a first inclined surface provided at a first side of the inclined plate, and a first flat portion continuously formed at an upper end of the first inclined surface, and
   a second inclined surface provided at a second side of the inclined plate, and a second flat portion continuously formed at an upper end of the second inclined surface.

3. The side bracket of claim 2, wherein the first and second flat portions have a groove structure to prevent separation of pressing portions.

4. The side bracket of claim 2, wherein the rotational member comprises a grip portion gripped and rotated by an operator, and one pair of pressing portions formed to protrude under the grip portion and to press the inclined plate while being rotated and in contact with the inclined plate.

5. The side bracket of claim 1, wherein a first side of the fixing shaft is coupled to a center of the rotational member so that the rotational member is capable of being rotated, and a second side of the fixing shaft is fixed to the side wall supporting portion in which the distance controller is not installed.

* * * * *